United States Patent
Ghosh et al.

(10) Patent No.: US 12,432,545 B2
(45) Date of Patent: Sep. 30, 2025

(54) CONTROLLING SWITCH TIMING IN TIME DIVISION DUPLEXING DEVICES

(71) Applicant: QUALCOMM Incorporated, San Diego, CA (US)

(72) Inventors: Priyangshu Ghosh, Hyderabad (IN); Raveesh Juneja, Hyderabad (IN); Ravinder Kumar, Meham (IN)

(73) Assignee: QUALCOMM Incorporated, San Diego, CA (US)

( * ) Notice: Subject to any disclaimer, the term of this patent is extended or adjusted under 35 U.S.C. 154(b) by 885 days.

(21) Appl. No.: 17/643,336

(22) Filed: Dec. 8, 2021

(65) Prior Publication Data
US 2023/0179986 A1 Jun. 8, 2023

(51) Int. Cl.
*H04W 8/18* (2009.01)
*H04W 68/00* (2009.01)
*H04W 88/06* (2009.01)

(52) U.S. Cl.
CPC ............. *H04W 8/18* (2013.01); *H04W 68/00* (2013.01); *H04W 88/06* (2013.01)

(58) Field of Classification Search
CPC ........ H04W 8/18; H04W 68/00; H04W 88/06
USPC ....................................................... 455/418
See application file for complete search history.

(56) References Cited

U.S. PATENT DOCUMENTS

| | | | |
|---|---|---|---|
| 10,623,946 B1* | 4/2020 | Kumar | H04W 76/16 |
| 2013/0273895 A1* | 10/2013 | Adamietz | H04M 1/724 455/415 |
| 2017/0118761 A1* | 4/2017 | Deshpande | H04W 72/53 |
| 2021/0084648 A1* | 3/2021 | Gilmore | H04B 1/006 |
| 2022/0053606 A1* | 2/2022 | Jeong | H04L 5/0048 |

* cited by examiner

*Primary Examiner* — Ahmad F. Matar
*Assistant Examiner* — Jirapon Tulop
(74) *Attorney, Agent, or Firm* — Haynes and Boone, LLP

(57) ABSTRACT

A method of wireless communication performed by a user equipment (UE), the method including: operating in a mode in which a first subscriber identity module (SIM) is designated as a default data subscription (DDS) and a second SIM is designated as a non-default data subscription (nDDS), including the first SIM being active and the second SIM being idle; determining positions of uplink symbols and downlink symbols within a slot format of the first SIM; causing a hardware switch of the UE to couple the second SIM to an antenna of the UE during a first symbol that is configured as uplink or flexible; and performing a page decode operation by the second SIM while the second SIM is coupled to the antenna.

26 Claims, 8 Drawing Sheets

CONTROLLING SWITCH TIMING IN TIME DIVISION DUPLEXING DEVICES

TECHNICAL FIELD

This application relates to wireless communication systems, and more particularly controlling switching in time division duplexing systems.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology, which may be referred to as $5^{th}$ Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Furthermore, as wireless communication becomes cheaper and more reliable, expectations among consumers change. Some UE manufacturers are responding to consumer preferences by including multiple subscriber identity modules (SIMs) within UEs.

However, including multiple SIMs within a device may lead to scenarios in which activities by one SIM may interfere with or preclude activities by the other SIM. There is a need in the art for techniques to manage use of multiple subscriptions in multi-SIM devices.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication performed by a user equipment (UE) includes: operating in a mode in which a first subscriber identity module (SIM) is designated as a default data subscription (DDS) and a second SIM is designated as a non-default data subscription (nDDS), including the first SIM being active and the second SIM being idle; determining positions of uplink symbols and downlink symbols within a slot format of the first SIM; causing a hardware switch of the UE to couple the second SIM to an antenna of the UE during a first symbol that is configured as uplink or flexible; and performing a page decode operation by the second SIM while the second SIM is coupled to the antenna.

In an additional aspect of the disclosure, a user equipment (UE) includes: a first subscriber identity module (SIM) and a second SIM; an antenna switching module disposed between the first SIM and an antenna and disposed between the second SIM and the antenna; means for operating in a mode in which a first subscriber identity module (SIM) is designated as a default data subscription (DDS) and a second SIM is designated as a non-default data subscription (nDDS), including the first SIM being active and the second SIM being idle; means for analyzing positions of uplink symbols and downlink symbols within a slot format of the first SIM; means for causing the antenna switching module associated with radio frequency (RF) receive circuitry of the UE to couple the second SIM to antenna during a first symbol that is configured as uplink or flexible in accordance with analyzing the positions of the uplink symbols and the downlink symbols; and means for performing a page decode operation by the second SIM while the second SIM is coupled to the antenna.

In an additional aspect of the disclosure, a UE includes: code for operating the UE so that a first subscriber identity module (SIM) is in an active mode and a second SIM is in an idle mode; code for analyzing a slot format from a network, the slot format defining at least some symbols for uplink and other symbols for downlink for the first SIM; code for, consistent with the analyzing, setting a timing for a radio frequency (RF) switch of the UE to couple the second SIM to an antenna, wherein the timing is set to avoid interfering with at least one of the other symbols for downlink; and code for performing a page decode operation by the second SIM while the second SIM is coupled to the antenna.

In an additional aspect of the disclosure, a UE includes a first subscriber identity module (SIM) associated with a first service provider subscription and a second SIM associated with a second service provider subscription; a processor configured to access the first SIM and the second SIM, wherein the processor is further configured to: operate the first SIM in an active mode and the second SIM in an idle mode; analyze a slot format from a network, the slot format defining at least some symbols for uplink and other symbols for downlink for the first SIM; consistent with analyzing the slot format, set a timing for an antenna switching module of the UE to couple the second SIM to an antenna, wherein the timing is set to avoid interfering with at least one of the other symbols for downlink; and perform a page decode operation by the second SIM while the second SIM is coupled to the antenna.

Other aspects, features, and embodiments will become apparent to those of ordinary skill in the art, upon reviewing the following description of specific, exemplary aspects in conjunction with the accompanying figures. While features may be discussed relative to certain aspects and figures below, all aspects can include one or more of the advantageous features discussed herein. In other words, while one or more aspects may be discussed as having certain advantageous features, one or more of such features may also be used in accordance with the various aspects discussed herein. In similar fashion, while exemplary aspects may be discussed below as device, system, or method aspects it should be understood that such exemplary aspects can be implemented in various devices, systems, and methods.

DETAILED DESCRIPTION

Figure 1:
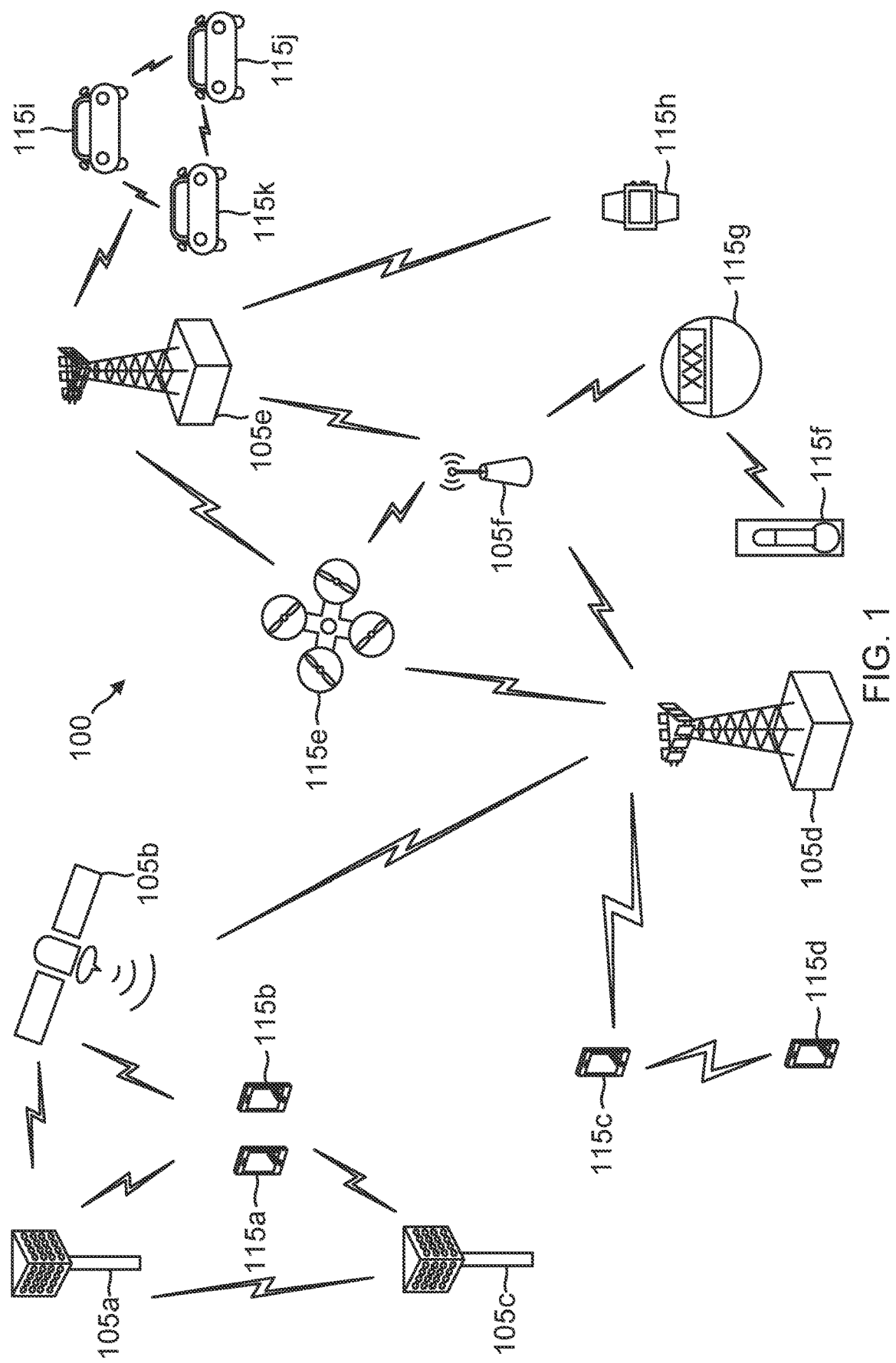
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some aspects, well-known structures and components are shown in block diagram form in order to avoid obscuring such concepts.

This disclosure relates generally to wireless communications systems, also referred to as wireless communications networks. In various aspects, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with a ULtra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including control with strong security to safeguard sensitive personal, financial, or classified information, ultra-high reliability (e.g., ~99.9999% reliability), ultra-low latency (e.g., ~1 ms), and users with wide ranges of mobility or lack thereof, and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

A 5G NR system may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW. In certain aspects, frequency bands for 5G NR are separated into two different frequency ranges, a frequency range one (FR1) and a frequency range two (FR2). FR1 bands include frequency bands at 7 GHz or lower (e.g., between about 410 MHz to about 7125 MHz). FR2 bands include frequency bands in mmWave ranges between about 24.25 GHz and about 52.6 GHz. The mmWave bands may have a shorter range, but a higher bandwidth than the FR1 bands. Additionally, 5G NR may support different sets of subcarrier spacing for different frequency ranges.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UL/downlink scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

In certain aspects, a wireless communication device or UE is a multiple SIM (MultiSim) device capable of utilizing multiple subscriptions for communication with one or more networks. For instance, the UE may include two SIMs, a first SIM for a first subscription and a second SIM for a second subscription. In some instances, the first and second subscriptions may be provided by the same operator. For example, the first subscription and the second subscription may correspond to different user accounts and/or services on the same operator network. In other instances, the first and second subscriptions may be provided by different operators. In any case, in certain scenarios, the UE may communicate using the first subscription and/or the second subscription. In some instances, the UE may operate in a dual-SIM dual-standby (DSDS) mode, where both subscriptions can be on standby (in an idle mode) waiting to begin communications. However, when a communication or network connection is established on one SIM (e.g., the first subscription), the other SIM (e.g., the second subscription) is no longer active. That is, one SIM may be active at a given time. The DSDS mode may be suitable for UEs that are equipped with a single transceiver and/or radio frequency (RF) chain which can either be utilized by the first subscription or the second subscription. In other instances, the UE may operate in a dual-SIM dual-active (DSDA) mode, where the UE may simultaneously connect to the same network or different networks via the first SIM and the second SIM. To operate in the DSDA mode, the UE may have separate transceiver and/or RF chains or resources for the first SIM and the second SIM. In the present disclosure, an operation or communication performed via a SIM may refer to an operation or communication performed for a wireless service subscription associated with the SIM (where the subscription information for the wireless service is stored).

For a multi-SIM device, one of the SIMs/subscriptions carries the internet data traffic, and it is referred to as the default data subscription (DDS) The other subscription—nDDS—is mainly used for voice and short message service (SMS). The user chooses which subscription is the DDS, and the user may change the DDS through a user interface (UI) of the UE.

For a multi-SIM device in DSDS mode, there may be periodic sharing of the UE's radio frequency (RF) resources between the two subscriptions for signal reception on one subscription and decoding pages and performing measurements in idle mode on the other subscription. Such periodic sharing may result in undesirable block error rate (BLER) in some instances, as described below.

For instance, the inventors have observed that switching within an antenna switch module may cause a brief and periodic mismatch of impedance. One instance in which that may occur is when a UE may cause the antenna switch module to couple an idle-mode SIM to RF receive circuitry while the RF receive circuitry is in use by an active-mode SIM. The brief instant of the impedance mismatch may be shorter than a symbol length in some examples, though that may be enough to cause a downlink symbol to be unreadable by the active-mode SIM. In some instances, when a single symbol of a frame is missed, that may cause the entire frame to be requested and re-transmitted. Furthermore, the switching of the antenna switch module may be periodic, thereby causing a frame to be re-transmitted to the active-mode SIM every paging period of the idle-mode SIM.

An example system may as a default perform antenna switching right before (e.g., in a symbol immediately preceding) a symbol used for paging and perform antenna switching right after the symbol used for paging to couple and un-couple, respectively, the idle-mode SIM to the RF circuitry. The timing of the switching is performed without regard to the designations of the corresponding symbols of the active-mode SIM. For instance, both of the corresponding symbols for the active-mode SIM may be used for downlink, thereby causing downlink interference on those corresponding symbols.

In some implementations, a UE may take into account a slot format for the active-mode SIM when scheduling timing of antenna switching with respect to operation of the idle-mode SIM. The UE may have software or hardware logic that analyzes the slot format for the active-mode SIM and schedules switching operations of the antenna switch module to avoid symbols that would experience interference from the switching. Specifically, downlink symbols of the active-mode SIM may be expected to experience interference because the idle-mode SIM and the active-mode SIM share RF receive circuitry. By contrast, an uplink symbol would not be expected to experience interference, assuming that the RF transmit circuitry is separated from the RF receive circuitry. Therefore, the UE may include functionality to analyze the slot format for the active-mode SIM, determine which symbols within the slot format may be subject to interference from antenna switch module operation, and schedule antenna switch module operation to avoid symbols that would experience interference.

Continuing with the example, in some instances uplink symbols for the active-mode SIM may be far between enough that it is not possible or not practical to wait for the next uplink symbol to perform un-coupling switching at the antenna switch module. In such instances, the UE may instead determine to set the timing of the antenna switch module to interfere with one or more downlink symbols of the active-mode SIM. However, the UE may include logic to avoid symbols that are configured for receiving certain types of signals. Symbols configured for synchronization signal blocks (SSBs) or tracking reference signals (TRSs) may be avoided when possible, though the scope of implementations may include avoiding any particular type of signal.

In other words, various implementations may include the UE implementing software or hardware logic to track and analyze slot formats for one or both of its SIMs and then to schedule antenna switch module switching operations to either avoid or coincide with certain symbols based upon analyzing the slot formats. As a result, a UE may eliminate or at least reduce BLER that would otherwise be expected due to downlink interference at an active-mode SIM.

Various implementations may include advantages. For instance, implementations providing for antenna switch module timing may experience greater downlink (DL) throughput to the active-mode SIM compared to a multi-SIM device that is unable to time antenna switching based on analyzing a slot format. The greater DL throughput may lead to more efficient operation of the active-mode SIM as well as greater user satisfaction.

FIG. 1 illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 (individually labeled as 115a, 115b, 115c, 115d, 115e, 115f, 115g, 115h, and 115k) and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support communications with ultra-reliable and redundant links for devices, such as the UE 115e, which may be airborne. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-action-size configurations by communicating with another user device which relays its information to the network, such as the UE 115f communicating temperature measurement information to the smart meter, the UE 115g, which is then reported to the network through the small cell BS 105*f*. The network 100 may also provide additional network efficiency through dynamic, low-latency TDD/FDD communications, such as V2V, V2X, C-V2X communications between a UE 115*i*, 115*j*, or 115*k* and other UEs 115, and/or vehicle-to-infrastructure (V2I) communications between a UE 115*i*, 115*j*, or 115*k* and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some aspects, the subcarrier spacing between adjacent subcarriers may be fixed, and the total number of subcarriers (K) may be dependent on the system BW. The system BW may also be partitioned into subbands. In other aspects, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some aspects, the BSs 105 may broadcast the PSS, the SSS, and/or the MIB in the form of synchronization signal block (SSBs) and may broadcast the RMSI and/or the OSI over a physical downlink shared channel (PDSCH). The MIB may be transmitted over a physical broadcast channel (PBCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant. The connection may be referred to as an RRC connection. When the UE 115 is actively exchanging data with the BS 105, the UE 115 is in an RRC connected state.

In an example, after establishing a connection with the BS 105, the UE 115 may initiate an initial network attachment procedure with the network 100. The BS 105 may coordinate with various network entities or fifth generation core (5GC) entities, such as an access and mobility function (AMF), a serving gateway (SGW), and/or a packet data network gateway (PGW), to complete the network attachment procedure. For example, the BS 105 may coordinate with the network entities in the 5GC to identify the UE, authenticate the UE, and/or authorize the UE for sending and/or receiving data in the network 100. In addition, the AMF may assign the UE with a group of tracking areas (TAs). Once the network attach procedure succeeds, a context is established for the UE 115 in the AMF. After a successful attach to the network, the UE 115 can move around the current TA. For tracking area update (TAU), the BS 105 may request the UE 115 to update the network 100 with the UE 115's location periodically. Alternatively, the UE 115 may only report the UE 115's location to the network 100 when entering a new TA. The TAU allows the network 100 to quickly locate the UE 115 and page the UE 115 upon receiving an incoming data packet or call for the UE 115.

In some aspects, the BS 105 may communicate with a UE 115 using HARQ techniques to improve communication reliability, for example, to provide a URLLC service. The BS 105 may schedule a UE 115 for a PDSCH communication by transmitting a DL grant in a PDCCH. The BS 105 may transmit a DL data packet to the UE 115 according to the schedule in the PDSCH. The DL data packet may be transmitted in the form of a transport block (TB). If the UE 115 receives the DL data packet successfully, the UE 115 may transmit a HARQ ACK to the BS 105. Conversely, if the UE 115 fails to receive the DL transmission successfully, the UE 115 may transmit a HARQ NACK to the BS 105. Upon receiving a HARQ NACK from the UE 115, the BS 105 may retransmit the DL data packet to the UE 115. The retransmission may include the same coded version of DL data as the initial transmission. Alternatively, the retransmission may include a different coded version of the DL data than the initial transmission. The UE 115 may apply soft combining to combine the encoded data received from the initial transmission and the retransmission for decoding. The BS 105 and the UE 115 may also apply HARQ for UL communications using substantially similar mechanisms as the DL HARQ.

In some aspects, the network 100 may operate over a system BW or a component carrier (CC) BW. The network 100 may partition the system BW into multiple bandwidth parts (BWPs) (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In some aspects, a UE 115 may be capable of utilizing multiple SIMs and may operate so that one SIM is in an active mode and the other SIM is in an idle mode (e.g., DSDS mode). The UE 115 may manage antenna switch timing to eliminate or at least reduce DL symbol interference in the active-mode SIM, as explained in more detail below.

Figure 2:
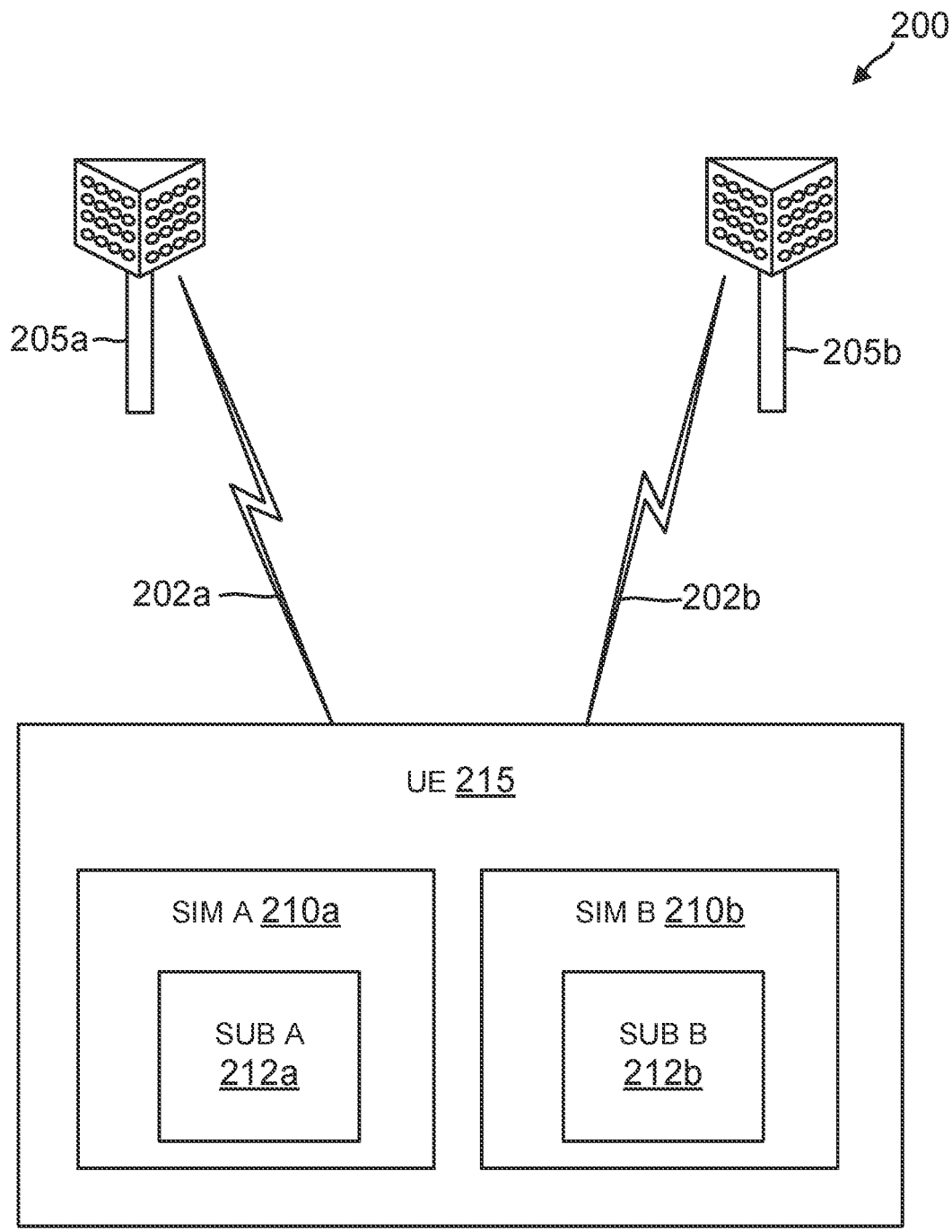
FIG. 2 illustrates a communication scenario utilizing multiple subscriptions according to some aspects of the present disclosure.

FIG. 2 illustrates a communication scenario 200 that utilizes multiple subscriptions according to some aspects of the present disclosure. The communication scenario 200 may correspond to a communication scenario among BSs 105 and or UEs 115 in the network 100. For simplicity, FIG. 2 illustrates two BSs 205 (shown as 205a and 205b) and one UE 215, but a greater number of UEs 215 (e.g., about 3, 4, 3, 6, 7, 8, 9, 10, or more) and/or BSs 205 (e.g., the about 3, 4 or more) may be supported. The BS 205 and the UEs 215 may be similar to the BSs 105 and the UEs 115, respectively.

In the scenario 200, the UE 215 is capable of utilizing multiple SIMs (e.g., SIM cards) for communication with one or more networks. For simplicity, FIG. 2 illustrates the UE 215 including two SIMs 210 (shown as SIM A 210a and SIM B 210b), but the UE 215 may include more than two SIMs (e.g., about 3, 4 or more). In some aspects, each SIM 210 may include integrated circuits and/or memory configured to store information used for accessing a network, for example, to authenticate and identify the UE 215 as a subscriber of the network. Some examples of information stored at the SIM A 210a and/or SIM B 210b may include, but not limited to, a subscriber identity such as an international mobile subscriber identity (IMSI) and/or information and/or key used to identify and authenticate the UE 215 in a certain provider network. As an example, the UE 215 may subscribe to a first operator and a second operator. That is, the UE 215 may have a first subscription 212a (shown as SUB A) with the first operator and a second subscription 212b (shown as SUB B) with the second operator. Accordingly, the SIM A 210a may store or maintain information for accessing a network of the first operator based on the first subscription 212a, and the SIM B 210b may store information for accessing a network of the second operator based on the second subscription 212b. In some instances, the first operator and the second operator may correspond to the same operator. For example, the first subscription 212a and the second subscription 212b may correspond to different user accounts and/or services subscribed with the same operator. In other instances, the first operator may be different from the second operator.

In operation, the UE 215 may communicate with a BS 205a (operated by the first operator) using the SIM A 210a via a radio link 202a. Further, the UE 215 may communicate with a BS 205b (operated by the second operator) using the SIM B 210b via a radio link 202b. In some aspects, the UE 215 may use the same radio access technology (e.g., NR or NR-U) for communication with the BS 205a and the BS 205b. In other aspects, the UE 215 may use one radio access technology (e.g., NR or NR-U) for communication with the BS 205a and another radio access technology (e.g., LTE) for communication with the BS 205b. Although FIG. 2 illustrates the UE 215 communicates with different BSs 205 using the SIM A 210a and the SIM B 210b, it should be understood that in other examples the UE 215 may communicate with the same BS. For instance, the UE 215 may communicate with the same BS 205a for the first subscription 212a via the SIM A 210a and for the second subscription 212b via the SIM B 210b.

In some aspects, the UE 215 may operate in a DSDS mode, where both SIMs 210a and 210b can be on standby (in an idle mode) waiting to begin communications. When a communication is established on one SIM (e.g., the SIM A 210a), the other SIM (e.g., the SIM B 210b) is no longer active. That is, one SIM may be active at a given time. For instance, both SIMs 210 may share a single transceiver and/or RF chain at the UE 215 for communications with corresponding network(s).

In some aspects, the radio link 202a between the UE 215 and the BS 205a and the radio link 202b between the UE 215 and the BS 205b may be over orthogonal bands such as FR1/FR2 or low band/high band FR1. Of course, any combination of radio links 202 is possible, and the radio links may even take place using different radio access technologies. For instance, radio link 202a may carry communications according to 5G protocols, whereas radio link 202b may carry communications according to LTE protocols.

Furthermore, UE 215 may manage antenna switching, according to the techniques described below with respect to Figures _.

Figure 3:
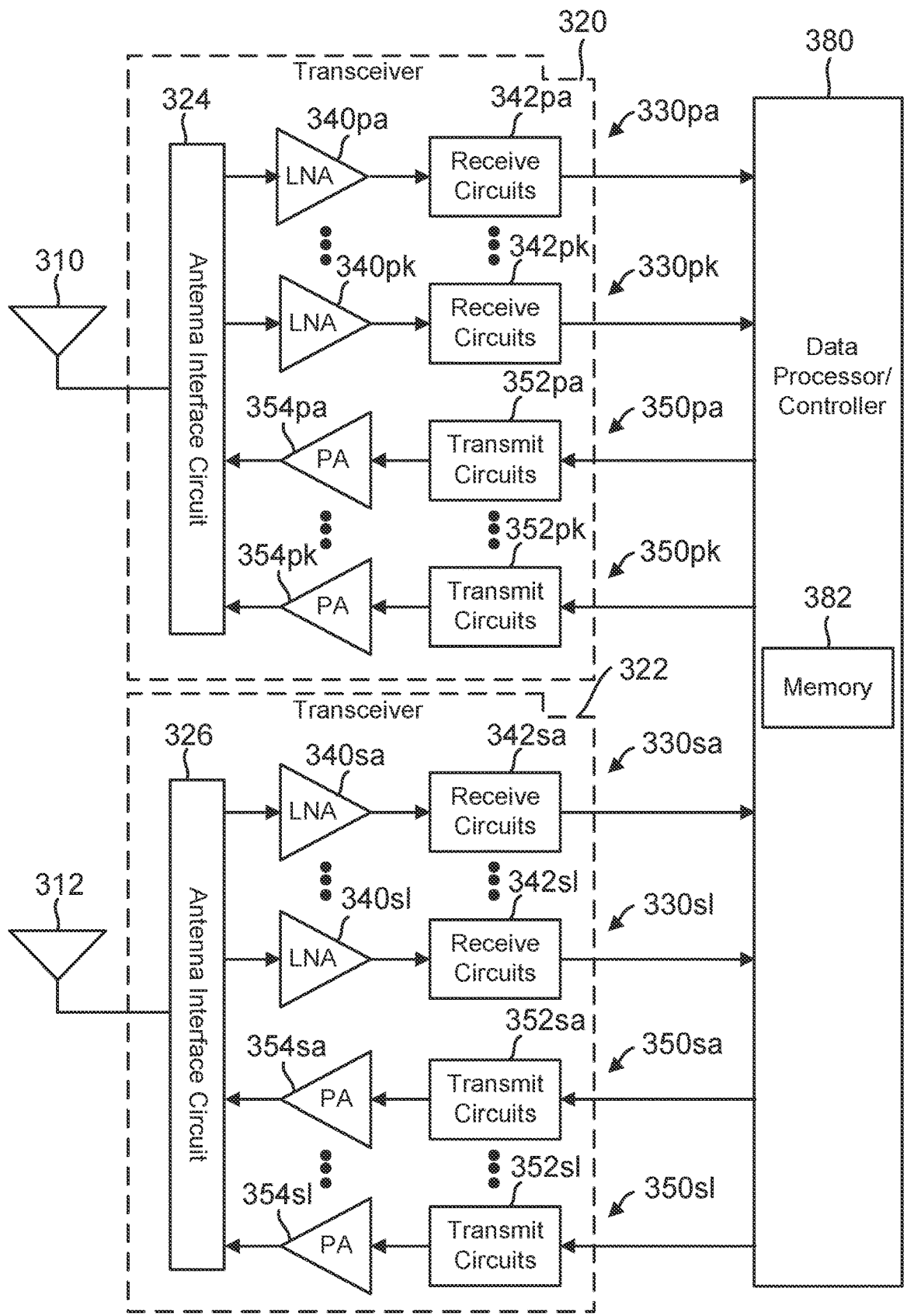
FIG. 3 is a block diagram of a hardware architecture of a UE, such as the UEs of FIGS. 1-2, according to some aspects of the present disclosure.
Figure 7:
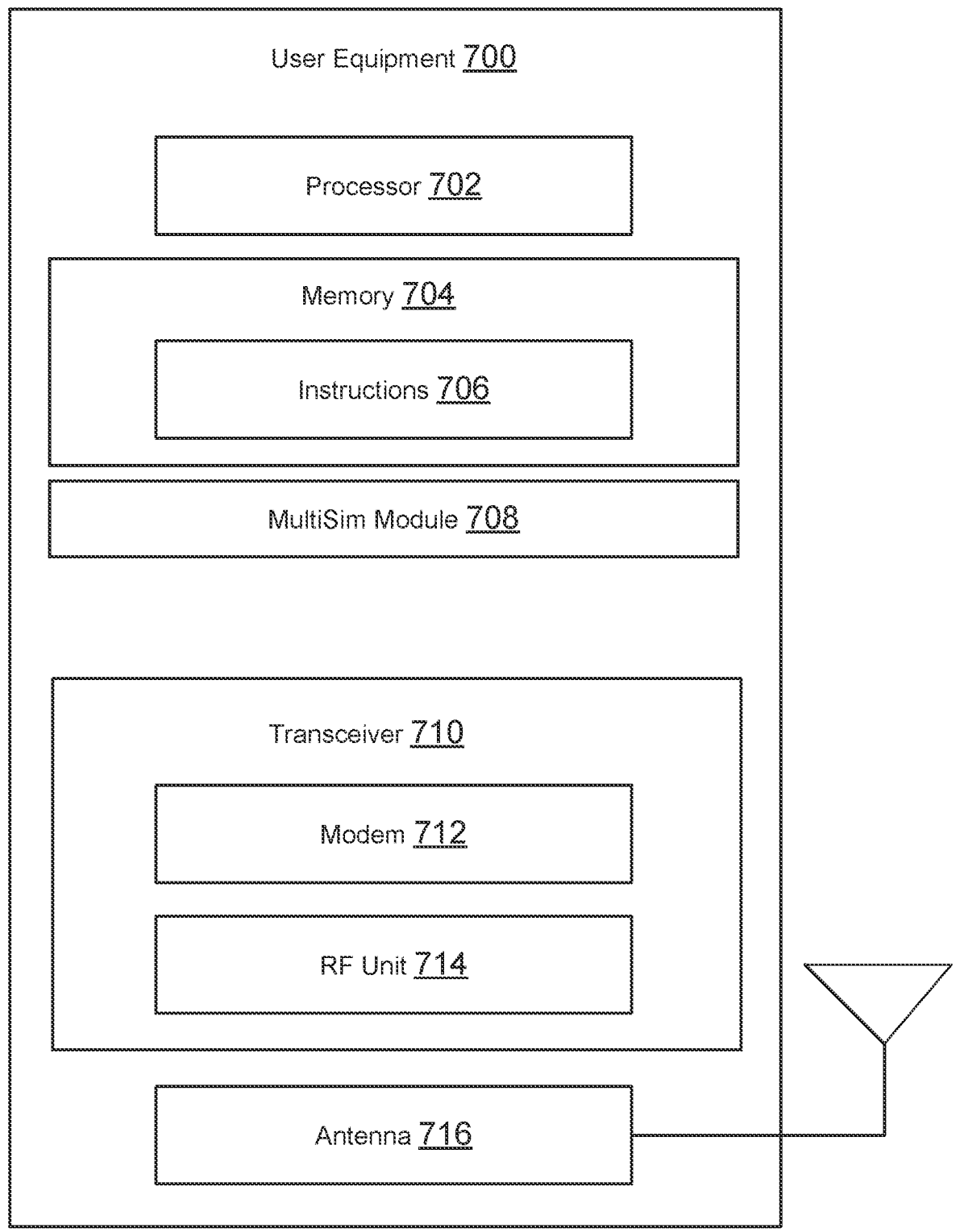
FIG. 7 illustrates a block diagram of a user equipment (UE) according to some aspects of the present disclosure.

FIG. 3 illustrates an example hardware architecture for RF chains, which may be implemented within UE 115 (FIG. 1), UE 215 (FIG. 2), or UE 700 (FIG. 7). In this exemplary design, the hardware architecture includes a transceiver 320 coupled to a first antenna 310, a transceiver 322 coupled to a second antenna 312, and a data processor/controller 380. Transceiver 320 includes multiple (K) receivers 330pa to 330pk and multiple (K) transmitters 350pa to 350pk to support multiple frequency bands, multiple radio technologies, carrier aggregation, etc. Transceiver 322 includes L receivers 330sa to 330s1 and L transmitters 350sa to 350s1 to support multiple frequency bands, multiple radio technologies, carrier aggregation, receive diversity, multiple-input multiple-output (MIMO) transmission from multiple transmit antennas to multiple receive antennas, etc.

In the exemplary design shown in FIG. 3, each receiver 330 includes an LNA 340 and receive circuits 342. For data reception, antenna 310 receives signals from base stations and/or other transmitter stations and provides a received RF signal, which may be routed through an antenna interface circuit 324 and presented as an input RF signal to a selected receiver. Antenna interface circuit 324 may include switches, duplexers, transmit filters, receive filters, matching circuits, etc. The description below assumes that receiver 330pa is the selected receiver, though the described operations apply equally well to any of the other receivers 330. Within receiver 330pa, an LNA 340pa amplifies the input RF signal and provides an output RF signal. Receive circuits 342pa downconvert the output RF signal from RF to baseband, amplify and filter the downconverted signal, and provide an analog input signal to data processor 380. Receive circuits 342pa may include mixers, filters, amplifiers, matching circuits, an oscillator, a local oscillator (LO) generator, a phase locked loop (PLL), etc. Each remaining receiver 330 in transceivers 320 and 322 may operate in a similar manner as receiver 330pa.

In the exemplary design shown in FIG. 3, each transmitter 350 includes transmit circuits 352 and a power amplifier (PA) 354. For data transmission, data processor 380 processes (e.g., encodes and modulates) data to be transmitted and provides an analog output signal to a selected transmitter. The description below assumes that transmitter 350pa is the selected transmitter, though the described operations apply equally well to any of the other transmitters 350. Within transmitter 350pa, transmit circuits 352pa amplify, filter, and upconvert the analog output signal from baseband to RF and provide a modulated RF signal. Transmit circuits 352pa may include amplifiers, filters, mixers, matching circuits, an oscillator, an LO generator, a PLL, etc. A PA 354pa receives and amplifies the modulated RF signal and provides a transmit RF signal having the proper output power level. The transmit RF signal may be routed through antenna interface circuit 324 and transmitted via antenna 310. Each remaining transmitter 350 in transceivers 320 and 322 may operate in a similar manner as transmitter 350pa.

FIG. 3 shows an exemplary design of receiver 330 and transmitter 350. A receiver and a transmitter may also include other circuits not shown in FIG. 3, such as filters, matching circuits, etc. All or a portion of transceivers 320 and 322 may be implemented on one or more analog (ICs, RF ICs (RFICs), mixed-signal ICs, etc. For example, LNAs 340 and receive circuits 342 within transceivers 320 and 322 may be implemented on multiple IC chips or on the same IC chip. The circuits in transceivers 320 and 322 may also be implemented in other manners.

Data processor/controller 380 may perform various functions for wireless device 110. For example, data processor 380 may perform processing for data being received via receivers 330 and data being transmitted via transmitters 350. Controller 380 may control the operation of the various circuits within transceivers 320 and 322. A memory 382 may store program codes and data for data processor/controller 380. Data processor/controller 380 may be implemented on one or more application specific integrated circuits (ASICs) and/or other ICs.

Controller 380 may be in communication with one or more SIMs to provide DSDA operation in which one SIM may be transmitting and receiving data, while the other SIM may be in idle mode. The controller 380 may execute software logic that assigns one of the transceivers 320, 322 to a particular SIM and the other one of the transceivers to the other SIM in a dual SIM implementation. In another example, the controller 380 may assign both transceivers 320, 322 to both SIMs, thereby allowing both SIMs to employ multi-antenna operations, such as beam forming and the like. In one example implementation, one of the SIMs is active, whereas the other SIM is in idle mode.

In one example, a first SIM (e.g., the DDS) may use the receiving portions of either or both of the transceivers 320, 322 to receive SSBs, TRSs, application data, and the like. However, the other SIM (e.g., the nDDS in idle mode) may periodically receive paging signals from its network.

In doing so, the idle-mode SIM may use RF resources (e.g., antennas 310, 312, interface circuits 324, 326, and various filters, mixers, oscillators, and processing circuits not shown) and require an antenna switch circuit (e.g., in interface circuits 324, 326) to create an RF receive path for the idle mode SIM. Once the idle-mode SIM has completed its page operation, then the antenna switching circuit may then uncoupled the RF receive path to the idle-mode SIM. Both creating the RF receive path and uncoupling the RF receive path includes a switching operation in which a physical circuit is closed or opened, respectively, and the switching operation may result in a brief amount of time in which impedance at the antenna elements 310, 312 are unmatched, thereby perhaps causing DL reception interference at the active-mode SIM. Accordingly, the data processor 380 may execute computer code to provide functionality to select times for the switching operations that either do not create DL reception interference or cause a lesser amount of DL reception interference.

Figure 4:
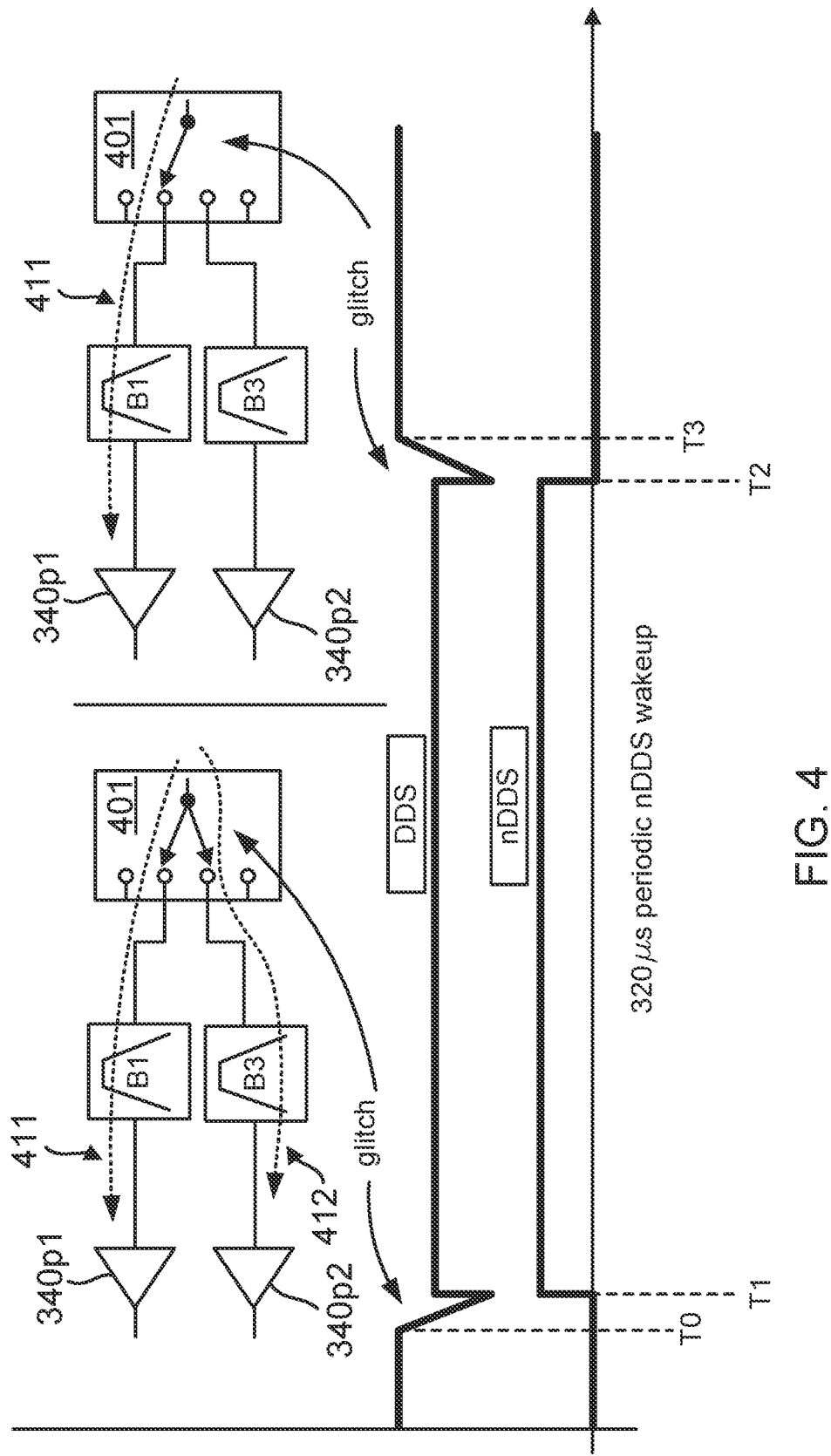
FIGS. 4-5 are example timelines for transmitting and receiving in a multi-SIM device, according to some aspects of the disclosure.

FIG. 4 is an illustration of an example timeline 400, according to one implementation. The timeline 400 may represent the operation of a UE, such as UE 115 (FIG. 1), UE 215 (FIG. 2), or UE 700 (FIG. 7).

For simplicity, FIG. 4 is described with respect to in transceiver 320 of FIG. 3, and it is understood that the operation of the components of FIG. 4 apply just as well to the components of transceiver 322 were generally to any multi-SIM UE within antenna switching module.

FIG. 4 illustrates a scenario in which antenna switching module 401 is operable to create RF receive paths 411, 412 for both the active-mode SIM (e.g., DDS) and the idle-mode SIM (e.g., nDDS). Antenna switching module 401 is illustrated as a hardware circuit that performs multiplexing. The antenna switching module 401 may be included within antenna interface circuit 324 of FIG. 3. RF receive path 411 represents an electrical conduction path from antenna 310 (FIG. 3) through antenna switching module 401 through filter B1, further through LNA 340p1, and on to a modem (not shown) that serves the active-mode SIM. Similarly, RF receive path 412 represents an electrical conduction path from antenna 310, through antenna switching module 401, through filter B3, further through LNA 340p2, and on to the same or a different modem (not shown) that serves the idle-mode SIM. The antenna switching module 401 may be controlled by data processor 380 (FIG. 3) or by another appropriate controller.

Looking at the left-hand side scenario of FIG. 4, the antenna switching module 401 begins a switching operation at time T0 to create RF receive path 412 to serve the idle-mode SIM. At time T1, the idle-mode SIM begins a periodic wake-up for paging, during which the idle-mode SIM receives a paging signal from the antenna and decodes the paging signal. A glitch is shown between times T0 and T1 in the waveform that corresponds to the active-mode SIM (the waveform being labeled "DDS"). The DDS waveform represents a voltage seen by filter B1 that serves the active-mode DDS, and the glitch is a temporary disturbance in the voltage level that may render a symbol unreadable to the active-mode SIM. The nDDS waveform represents the voltage seen by the filter B3 that serves the idle-mode SIM. The example of FIG. 4 refers to a 320 μs periodic wakeup for the idle-mode SIM. However, it is understood that such time period is for example only, and the concepts described herein may be adapted for use with any idle-mode SIM receive time.

The left-hand side scenario of FIG. 4 illustrates RF receive paths 411, 412 both being existent to provide physical, electrical conductive paths from the antenna to the processing circuitry serving each of the SIMs. From time T1 to time T2, the RF receive path 412 exists and serves the idle-mode SIM, and the wakeup period for paging operations ends at time T2. Further at time T2, the antenna switching module 401 performs a switching operation in which it un-couples the RF receive path 412, thereby leaving only RF receive path 411.

The glitches shown between times T0 to T1 and between times T2 to T3 may be caused by a temporary impedance mismatch at the antenna unit, and an impedance matching circuit (not shown) may be used to correct the impedance match during those times. Nevertheless, the glitches exist in the system. In one example, each of the glitches may last between 3 μs and 5 μs, though that depends on a particular implementation, and the scope of embodiments is not limited to any length of glitch. Each of the glitches may be long enough in time and severe enough in either phase or amplitude to cause a loss of one or more DL symbols for the active-mode SIM.

The actions of timeline 400 may be repeated periodically, such as every 320 μs, every 640 μs, or another appropriate period. In other words, without the switch operation timing control described herein, the active-mode SIM may lose at least two symbols during every one of those periods. Accordingly, the implementations described herein include controlling timing of operation of the antenna switching module 401 to eliminate or at least reduce interference with DL symbols of the active-mode SIM.

Figure 5:
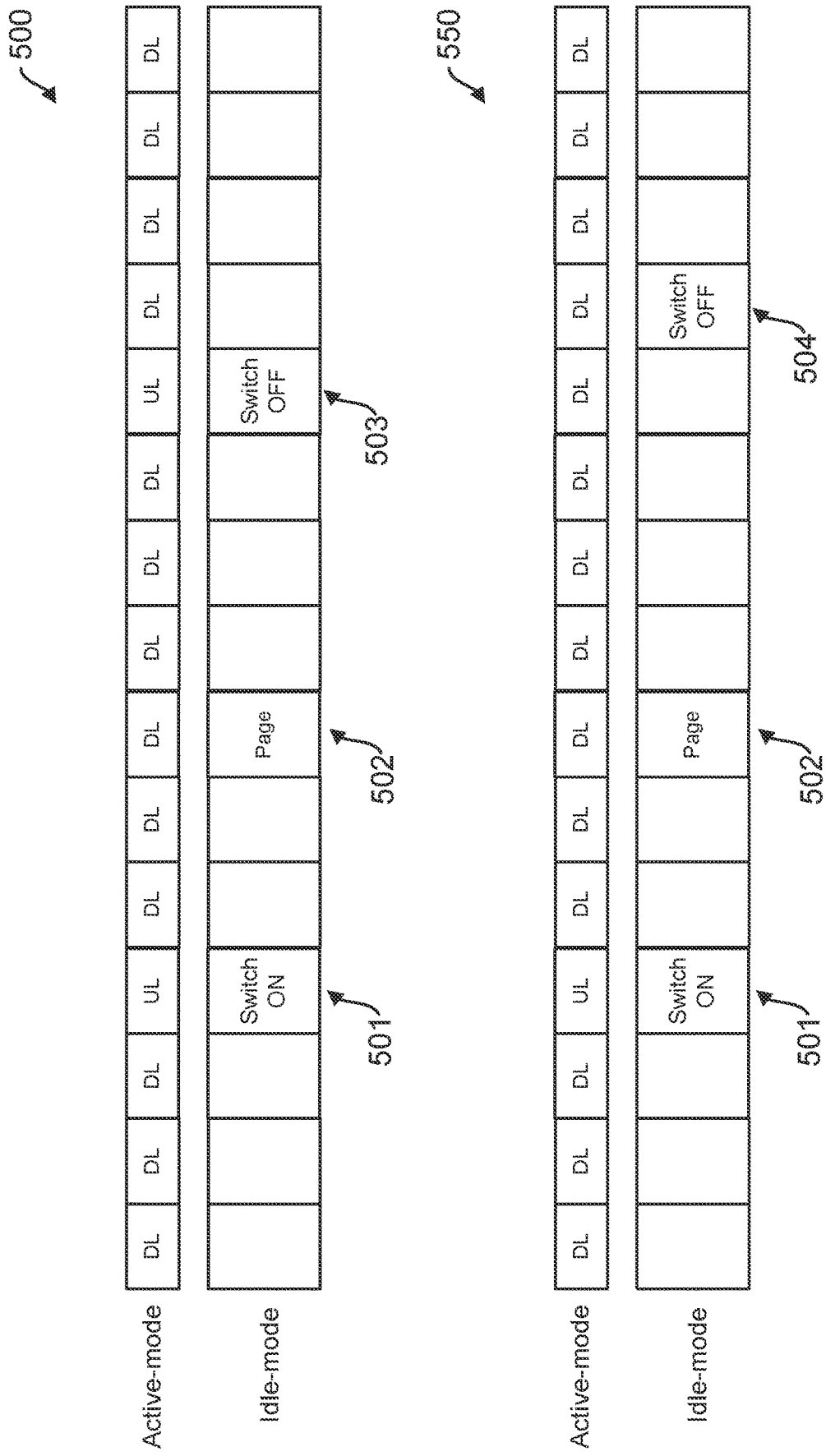

FIG. 5 is an illustration of two example timelines 500 and 550, according to one implementation. Both timelines 500, 550 may represent the operation of a UE, such as UE 115 (FIG. 1), UE 215 (FIG. 2), or UE 700 (FIG. 7).

Looking at timeline 500 first, it shows symbol timing within a slot format for an active-mode SIM and for an idle-mode SIM. For the active-mode SIM, the symbols are each labeled either DL or UL, corresponding to being configured for either downlink or uplink communications in a TDD system, respectively. In some implementations, some symbols may be configured as flexible so that some layers of control may use them for uplink or downlink communications. Although no symbol is labeled "flexible" in FIG. 5, it is understood that flexible symbols may be included in slot formats used by the active-mode SIM.

A slot format for the idle-mode SIM is also shown, and only symbol 502 is used for reception. The other symbols may be configured for neither uplink nor downlink, consistent with idle mode. In the example of timeline 500, the UE has set a timing constraint for the antenna switch module so that switching on or switching off does not occur within a DL symbol of the active-mode SIM. In this example, the UE has analyzed the slot format of the active-mode SIM, determined which of the symbols are configured for DL in which of the symbols are configured for UL, and set the antenna switch module timing to avoid DL symbols. For instance, the antenna switch module switches on during symbol 501, similar to the action shown between T0-T1 of FIG. 4. The idle-mode SIM receives the paging signal from the network during symbol 502. The antenna switch module then switches off during symbol 503, similar to the actions shown between T2-T3 of FIG. 4. The switching operation corresponding to symbol 501 also corresponds to a UL symbol of the active-mode slot format. Similarly, the switching operation corresponding to symbol 503 corresponds to a UL symbol of the active slot format as well. As a result, the UE avoids collisions between the switching operations and DL symbols, thereby potentially avoiding DL interference that might cause DL symbols to be lost.

Now looking to the timeline 550, the switching on operation at symbol 501 and the paging reception at symbol 502 are the same. However, the active-mode SIM has only one UL symbol in its slot format, and the UL symbol happens in time during the symbol 501. Therefore, the algorithm of the UE may not have an opportunity to avoid a DL symbol during the switching off operation. In this example, the algorithm of the UE may select symbol 504 for the switching off operation, even though symbol 504 corresponds to a DL symbol for the active-mode SIM. Further in this example, the UE may select a symbol for the switching off operation subject to one or more constraints. One constraint may include that the timing of the switching operation may not collide with a DL symbol that is configured for certain signals, such as SSB or TRS. Accordingly, the UE may analyze the slot format for the active-mode SIM, determine which of the symbols are configured for certain signals, and avoid placing a switching operation during a symbol based on a signal that is configured for the symbol. In the example of timeline 550, the DL symbol occurring during symbol 504 is not configured for either SSB or TRS and is, therefore, selected for the switching off operation of the antenna switching module.

The scope of embodiments is not limited to avoiding any particular signal, as signals other than SSB and TRS may be avoided in some instances. Nevertheless, a purpose of avoiding SSB and TRS signals may be to preserve the functionality provided by SSB and TRS at the cost of accepting that other DL signals may be lost.

Figure 6:
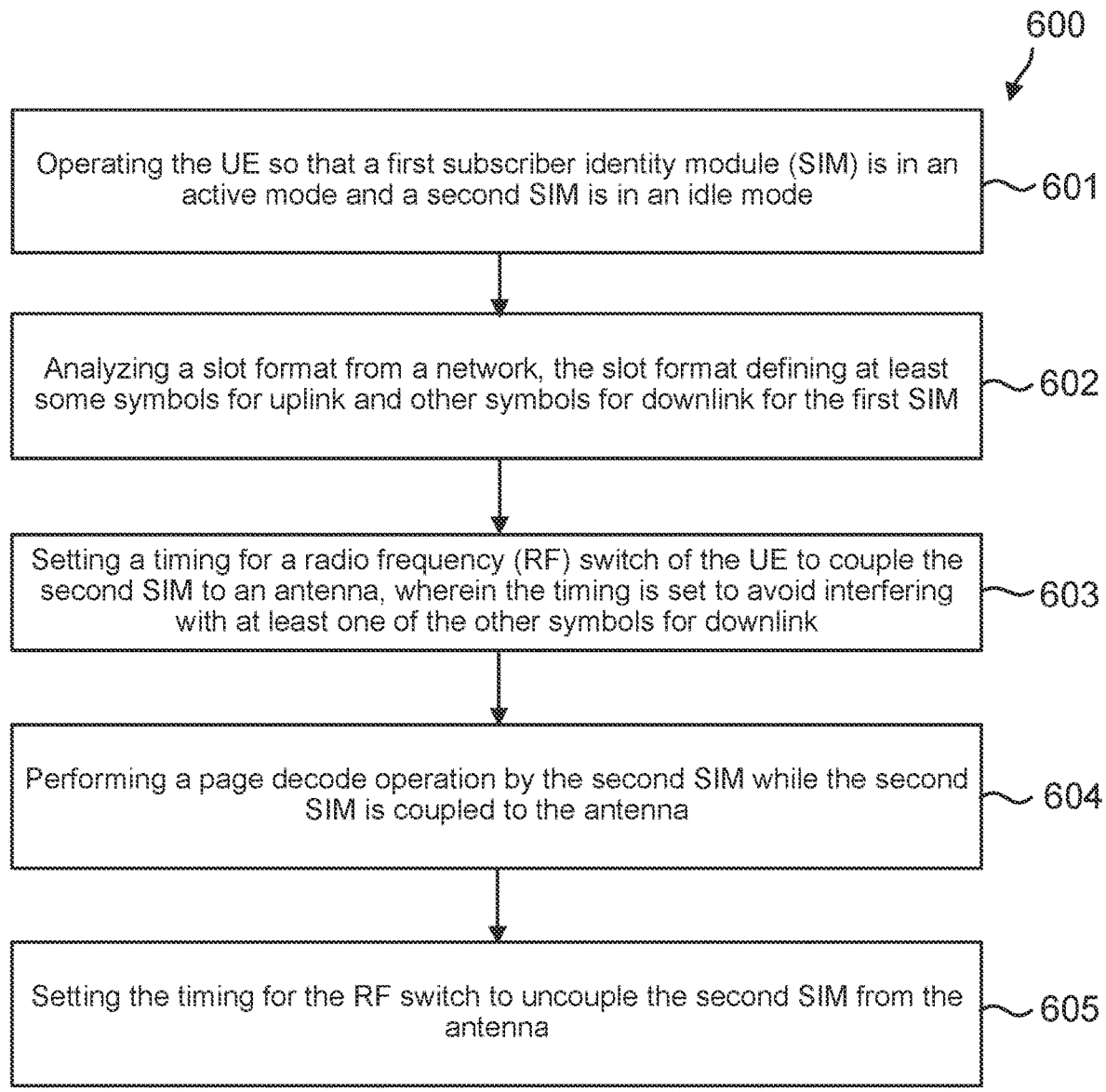
FIG. 6 is a diagram of an example method for timing a switching operation of an RF switch, according to some aspects of the present disclosure.

FIG. 6 is a flowchart of a method 600 to set RF switch timing to reduce or eliminate DL interruption in a multi-SIM system, according to some aspects of the present disclosure. The method 600 may be performed by UE, such as UE 115 (FIG. 1), UE 215 (FIG. 2), or UE 700 (FIG. 7). As illustrated, the method 600 includes a number of enumerated actions, but aspects of the method 600 may include additional actions before, after, and in between the enumerated actions. In some aspects, one or more of the enumerated actions may be omitted or performed in a different order.

At action 601, the UE operates so that one SIM is in an active mode and the other SIM is in an idle mode. In one example, the UE operates in a DSDS mode in which a first SIM is designated as the DDS, and in which a second SIM is the nDDS. Further in this example, the DDS is in active-mode, whereas the nDDS is in idle mode. The first SIM and the second SIM may be serviced by a same network or different networks.

At action 602, the UE analyzes the slot format that is received from a network. For instance, the network may use RRC or other signaling to configure some symbols as UL, some symbols as DL, and perhaps other symbols as flexible. The UE may analyze the slot format by examining the RRC information (or other information) to determine which symbols within a slot are configured for DL, UL, or flexible. The UE may further analyze the slot format to determine which symbols are configured for particular signals. For instance, some symbols may be configured for reception of SSB, reception of TRS, or other signals.

The example of FIG. 5 illustrates example slot formats for an active-mode SIM, showing some symbols being used for DL and other symbols being used for UL. Of course, any appropriate slot format may be received at action 602 and used for RF switch timing, as in actions 603 and 605.

At action 603, the UE sets a timing for an RF switch to couple the second SIM to an antenna of the UE. An example is shown in FIGS. 4-5, in which the RF switch (e.g., antenna switch module 401) is controlled to create RF receive path 412, which couples and antenna to the idle-mode SIM.

The timing in this example may be consistent with the analyzing that is performed at action 602. For instance, the UE may use logic to set the switch timing of action 603 to avoid interfering with at least one of the downlink symbols of the active-mode SIM. Therefore, the UE may take into account the information it analyzed at action 602 and use that information to choose from among the multiple symbols within the slot format to place the switch timing within a UL symbol or a flexible symbol if available. An example is shown in FIG. 5 in which the switching on is performed in a symbol 501 that corresponds to an uplink signal within a slot format of the active-mode SIM. In some examples, the symbol chosen for the switching operation may be adjacent a symbol used for receiving a page signal. However, in other examples, the signal chosen for the switching operation may be separated from a symbol used for receiving a page signal by one or more other symbols.

Action 603 is in contrast to other systems which may perform an antenna switching operation without regard to configuration of symbols, e.g., whether the symbols are configured for UL or DL or for a particular signal. Action 603 uses analysis of the slot format to choose symbols from among multiple symbols to reduce or at least avoid DL interference in the active-mode SIM.

As explained above, the switching operation itself may be accompanied by an impedance matching operation to match an impedance of the hardware switch and/or the antenna to an impedance of a load within the RF receive circuitry.

At action 604, the UE performs a page decode operation. Specifically, the second SIM (the idle-mode or nDDS) receives a paging signal through the antenna and through the RF switching circuit that is shared with the other SIM. The second SIM may then decode the paging signal as appropriate and perform any other appropriate actions in that time. An example is shown in FIG. 5, in which the paging signal is received in symbol 502. Of course, paging operations may include more than simply receiving a paging signal, such as decoding the paging signal and performing actions appropriate with the contents of the decoded paging signal.

At action 605, the UE sets the timing for the RF switch to uncouple the second SIM from the RF receive circuitry. In some instances, action 605 may be performed with action 603 so that the UE sets both the switch on and switch off operations together rather than being separated by other actions.

At action 605, the UE sets the timing for the RF switch to uncouple the second SIM using the same or similar constraints as those described above with respect to action 603. For instance, the UE may use its analysis of the slot format to place the timing of the switching off to coincide with an uplink signal or a flexible symbol of the active-mode SIM. However, in some instances, there may not be an available UL symbol or flexible symbol within a pre-programmed time (e.g., a guard timer period) at which to place the switching off operation. In such an instance, the UE may use its analysis of the slot format to determine which of the symbols are configured for certain signals, such as SSB or TRS signals. The UE may then set the timing for the RF switch to perform the switching off during a symbol that is configured for something other than SSB or TRS (or some other signals). In some implementations, there may be a hierarchy of signals ranked in order of desirability for interrupting on the DL, with SSB and TRS being ranked to cause higher priority and other signals being ranked to cause lower priority.

An example of timing the RF switch to uncouple the second SIM (idle-mode SIM) is shown in FIG. 4 from times T2-T3 and in FIG. 5 at symbols 503 and 504. In the timeline 500 of FIG. 5, the switching off operation is performed during a UL symbol, whereas in timeline 550, the switching off operation is performed during a DL symbol but avoiding a signal having priority, such as SSB or TRS. The switching off time may be performed in a symbol adjacent a symbol used for paging signal reception or in another symbol as appropriate.

The action 601-605 may be repeated as often as appropriate. For instance, as the UE moves from one base station to another base station, configurations may be changed, including a timing of paging reception. Accordingly, the UE may adjust the RF switch timing as described above to avoid or at least reduce a number of DL symbols that are interfered with by RF switch operations.

FIG. 7 is a block diagram of an exemplary UE 700 according to some aspects of the present disclosure. The UE 700 may be a UE 115 or UE 215 as discussed above in FIGS. 1-2 and may conform to the hardware architecture described above with respect to FIG. 3. As shown, the UE 700 may include a processor 702, a memory 704, a MultiSim module 708, a transceiver 710 including a modem subsystem 712 and a radio frequency (RF) unit 714, and one or more antennas 716. These elements may be coupled with one another. The term "coupled" may refer to directly or indirectly coupled or connected to one or more intervening elements. For instance, these elements may be in direct or indirect communication with each other, for example via one or more buses.

The processor 702 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 702 may also be implemented as a combination of computing devices, e.g., a combination of a DSP and a microprocessor, a plurality of microprocessors, one or more microprocessors in conjunction with a DSP core, or any other such configuration.

The memory 704 may include a cache memory (e.g., a cache memory of the processor 702), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 704 includes a non-transitory computer-readable medium. The memory 704 may store, or have recorded thereon, instructions 706. The instructions 706 may include instructions that, when executed by the processor 702, cause the processor 702 to perform the operations described herein with reference to a UE 115, 215 in connection with aspects of the present disclosure, for example, aspects of FIGS. 1-6. Instructions 706 may also be referred to as code, which may include any type of computer-readable statements.

The MultiSim module 708 may be implemented via hardware, software, or combinations thereof. For example, the MultiSim module 708 may be implemented as a processor, circuit, and/or instructions 706 stored in the memory 704 and executed by the processor 702.

In some aspects, the MultiSim module 708 may include multiple SIMs or SIM cards (e.g., 2, 3, 4, or more) similar to the SIMs 210. Each SIM may be configured to store information used for accessing a network, for example, to authenticate and identify the UE 700 as a subscriber of the network. Some examples of information stored on a SIM may include, but not limited to, a subscriber identity such as an international mobile subscriber identity (IMSI) and/or information and/or key used to identify and authenticate the UE 700 in a certain provider network. In some aspects, the UE 700 may have a first subscription on a first SIM of the multiple SIMs and a second subscription on a second SIM of the multiple SIMs. The first subscription may identify the UE 700 by a first subscriber identity, and the second subscription may identify the UE 700 by a second subscriber identity.

In some embodiments, the functionality described above with respect to FIG. 6 may be included as logic within Multi-SIM module 708. Other embodiments, the functionality may be included in another component, such as in computer readable code within instructions 706 in memory 704.

As shown, the transceiver 710 may include the modem subsystem 712 and the RF unit 714.

The transceiver 710 can be configured to communicate bi-directionally with other devices, such as the BSs 105 and 205. The modem subsystem 712 may be configured to modulate and/or encode the data from the memory 704 and the MultiSim module 708 according to a modulation and coding scheme (MCS), e.g., a low-density parity check (LDPC) coding scheme, a turbo coding scheme, a convolutional coding scheme, a digital beamforming scheme, etc. The RF unit 714 may be configured to process (e.g., perform analog to digital conversion or digital to analog conversion, etc.) modulated/encoded data (e.g., PUSCH data, PUCCH UCI, MSG1, MSG3, etc.) or of transmissions originating from another source such as a UE 115, a BS 105, or an anchor. The RF unit 714 may be further configured to perform analog beamforming in conjunction with digital beamforming. Although shown as integrated together in transceiver 710, the modem subsystem 712 and the RF unit 714 may be separate devices that are coupled together at the UE 700 to enable the UE 700 to communicate with other devices.

The RF unit 714 may provide the modulated and/or processed data, e.g. data packets (or, more generally, data messages that may contain one or more data packets and other information), to the antennas 716 for transmission to one or more other devices. The antennas 716 may further receive data messages transmitted from other devices. The antennas 716 may provide the received data messages for processing and/or demodulation at the transceiver 710. The transceiver 710 may provide the demodulated and decoded data (e.g., RRC configurations, MIB, PDSCH data and/or PDCCH DCIs, etc.) to the MultiSim module 708 for processing. The antennas 716 may include multiple antennas of similar or different designs in order to sustain multiple transmission links.

In an aspect, the UE 700 can include multiple transceivers 710 implementing different RATs (e.g., NR and LTE). In an aspect, the UE 700 can include a single transceiver 710 implementing multiple RATs (e.g., NR and LTE). In an aspect, the transceiver 710 can include various components, where different combinations of components can implement different RATs.

Figure 8:
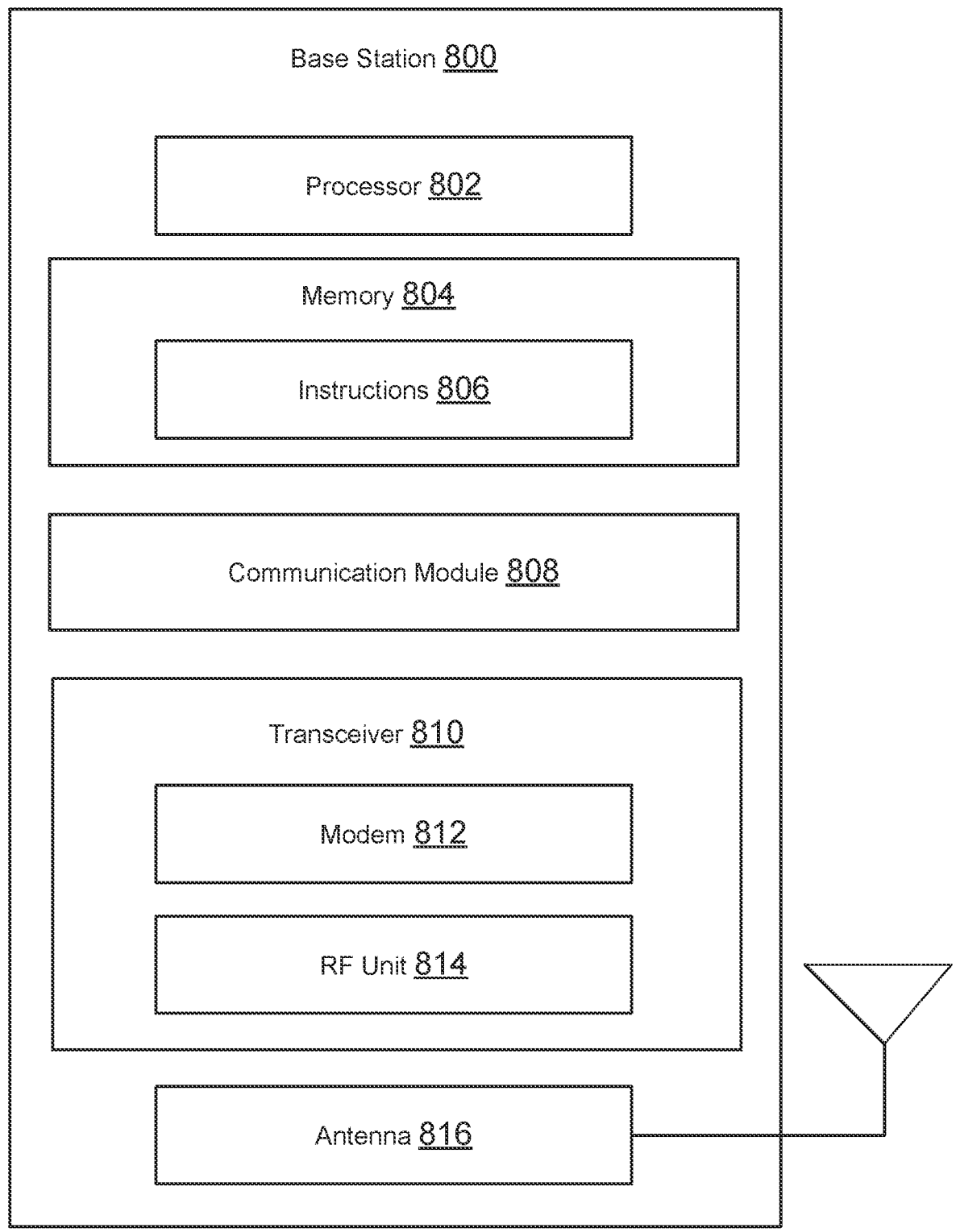
FIG. 8 illustrates a block diagram of a base station (BS) according to some aspects of the present disclosure.

FIG. 8 is a block diagram of an exemplary BS 800 according to some aspects of the present disclosure. The BS 800 may be a BS 105 or a BS 205 as discussed in FIGS. 1 and 2. As shown, the BS 800 may include a processor 802, a memory 804, a communication module 808, a transceiver 810 including a modem subsystem 812 and a RF unit 814, and one or more antennas 816. These elements may be coupled with one another. The term "coupled" may refer to directly or indirectly coupled or connected to one or more intervening elements. For instance, these elements may be in direct or indirect communication with each other, for example via one or more buses.

The processor 802 may have various features as a specific-type processor. For example, these may include a CPU, a DSP, an ASIC, a controller, a FPGA device, another hardware device, a firmware device, or any combination thereof configured to perform the operations described herein.

The processor 802 may also be implemented as a combination of computing devices, e.g., a combination of a DSP and a microprocessor, a plurality of microprocessors, one or more microprocessors in conjunction with a DSP core, or any other such configuration.

The memory 804 may include a cache memory (e.g., a cache memory of the processor 802), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 804 may include a non-transitory computer-readable medium. The memory 804 may store instructions 806. The instructions 806 may include instructions that, when executed by the processor 802, cause the processor 802 to perform operations described herein, for example, aspects of FIGS. 1 and 2. Instructions 806 may also be referred to as program code. The program code may be for causing a wireless communication device to perform these operations, for example by causing one or more processors (such as processor 802) to control or command the wireless communication device to do so. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The communication module 808 may be implemented via hardware, software, or combinations thereof. For example, the communication module 808 may be implemented as a processor, circuit, and/or instructions 806 stored in the memory 804 and executed by the processor 802. In some examples, the communication module 808 can be integrated within the modem subsystem 812. For example, the communication module 808 can be implemented by a combination of software components (e.g., executed by a DSP or a general processor) and hardware components (e.g., logic gates and circuitry) within the modem subsystem 812. The communication module 808 may communicate with one or more components of BS 800 to implement various aspects of the present disclosure, for example, aspects of FIGS. 1 and 2.

As shown, the transceiver 810 may include the modem subsystem 812 and the RF unit 814. The transceiver 810 can be configured to communicate bi-directionally with other devices, such as the UEs 115, 215 and/or BS 800 and/or another core network element. The modem subsystem 812 may be configured to modulate and/or encode data according to a MCS, e.g., a LDPC coding scheme, a turbo coding scheme, a convolutional coding scheme, a digital beamforming scheme, etc. The RF unit 814 may be configured to process (e.g., perform analog to digital conversion or digital to analog conversion, etc.) modulated/encoded data (e.g., RRC configurations, MIB, PDSCH data and/or PDCCH DCIs, etc.) from the modem subsystem 812 (on outbound transmissions) or of transmissions originating from another source such as a UE 115, 215, and/or UE 700. The RF unit 814 may be further configured to perform analog beamforming in conjunction with the digital beamforming. Although shown as integrated together in transceiver 810, the modem subsystem 812 and/or the RF unit 814 may be separate devices that are coupled together at the BS 800 to enable the BS 800 to communicate with other devices.

The RF unit 814 may provide the modulated and/or processed data, e.g. data packets (or, more generally, data messages that may contain one or more data packets and other information), to the antennas 816 for transmission to one or more other devices. The antennas 816 may further receive data messages transmitted from other devices and provide the received data messages for processing and/or demodulation at the transceiver 810. The transceiver 810 may provide the demodulated and decoded data (e.g., PUSCH data, PUCCH UCI, MSG1, MSG3, etc.) to the communication module 808 for processing. The antennas 816 may include multiple antennas of similar or different designs in order to sustain multiple transmission links.

In an aspect, the BS 800 can include multiple transceivers 810 implementing different RATs (e.g., NR and LTE). In an aspect, the BS 800 can include a single transceiver 810 implementing multiple RATs (e.g., NR and LTE). In an aspect, the transceiver 810 can include various components, where different combinations of components can implement different RATs.

Further aspects of the present disclosure include the following clauses:

1. A method of wireless communication performed by a user equipment (UE), the method comprising:
    operating in a mode in which a first subscriber identity module (SIM) is designated as a default data subscription (DDS) and a second SIM is designated as a non-default data subscription (nDDS), including the first SIM being active and the second SIM being idle;
    determining positions of uplink symbols and downlink symbols within a slot format of the first SIM;
    causing a hardware switch of the UE to couple the second SIM to an antenna of the UE during a first symbol that is configured as uplink or flexible; and
    performing a page decode operation by the second SIM while the second SIM is coupled to the antenna.

2. The method of clause 1, further comprising:
    causing the hardware switch to un-couple the second SIM from the antenna after the page decode operation has occurred and during a second symbol that is configured as uplink or flexible.

3. The method of clauses 1-2, wherein determining the positions of uplink symbols and downlink symbols comprises:
    analyzing the slot format of the first SIM to identify signal configurations of a plurality of symbols defined by the slot format.

4. The method of clause 3, further comprising:
    determining that an uplink symbol does not occur within a guard timer period after the page decode operation; and
    causing the hardware switch to un-couple the second SIM from the antenna after the page decode operation has occurred and during a second symbol that is configured as downlink and does not correspond to a synchronization signal block (SSB) or a tracking reference signal (TRS) in response to determining that the uplink symbol does not occur within the guard timer period.

5. The method of clause 3, further comprising:
    causing the hardware switch to un-couple the second SIM from the antenna after the page decode operation has occurred and during a second symbol that is configured as downlink and does not correspond to a synchronization signal block (SSB) or a tracking reference signal (TRS).

6. The method of clauses 1-5, wherein causing the hardware switch to couple the second SIM to the antenna includes:
    performing an impedance matching operation to match an impedance of the hardware switch to an impedance of a load within the UE.

7. The method of clauses 1-6, wherein the positions of the uplink symbols and the downlink symbols conform to a time division duplexing (TDD) mode of operation by the UE.

8. The method of clauses 1-7, wherein page decode is performed during a second symbol, and wherein the first symbol and the second symbol are adjacent.

9. The method of clauses 1-8, wherein page decode is performed during a second symbol, and wherein the first symbol and the second symbol are separated in time by at least one additional symbol.

10. The method of clauses 1-9, wherein determining the positions of uplink symbols and downlink symbols comprises:
analyzing the slot format of the first SIM to identify UL and DL configurations of a plurality of symbols defined by the slot format.

11. A non-transitory computer-readable medium having program code recorded thereon for wireless communication by a user equipment (UE), the program code comprising:
code for operating the UE so that a first subscriber identity module (SIM) is in an active mode and a second SIM is in an idle mode;
code for analyzing a slot format from a network, the slot format defining at least some symbols for uplink and other symbols for downlink for the first SIM;
code for, consistent with the analyzing, setting a timing for a radio frequency (RF) switch of the UE to couple the second SIM to an antenna, wherein the timing is set to avoid interfering with at least one of the other symbols for downlink; and
code for performing a page decode operation by the second SIM while the second SIM is coupled to the antenna.

12. The non-transitory computer-readable medium of clause 11, further comprising: code for setting the timing for the RF switch to uncouple the second SIM from the antenna, wherein the timing is set to avoid interfering with at least one of the other symbols for downlink.

13. The non-transitory computer-readable medium of clauses 11-12, wherein the code for operating the UE so that the first SIM is in an active mode comprises:
code for operating the UE so that the first SIM is designated as a default data subscription (DDS) and the second SIM is designated as a non-default data subscription (nDDS).

14. The non-transitory computer-readable medium of clauses 11-13, wherein the code for operating the UE so that the first SIM is in an active mode comprises:
operating the UE in a dual-SIM dual-standby (DSDS) mode.

15. The non-transitory computer-readable medium of clauses 11-14, further comprising:
code for determining that an uplink symbol does not occur within a guard timer period after the page decode operation; and
code for causing the RF switch to un-couple the second SIM from the antenna after the page decode operation has occurred and during a first symbol that is configured as downlink and does not correspond to a synchronization signal block (SSB) or a tracking reference signal (TRS) in response to determining that the uplink symbol does not occur within the guard timer period.

16. The non-transitory computer-readable medium of clauses 11-14, further comprising: causing the RF switch to un-couple the second SIM from the antenna after the page decode operation has occurred and during a first symbol that is configured as downlink and does not correspond to a synchronization signal block (SSB) or a tracking reference signal (TRS).

17. A user equipment (UE) comprising:
a first subscriber identity module (SIM) and a second SIM;
an antenna switching module disposed between the first SIM and an antenna and disposed between the second SIM and the antenna;
means for operating in a mode in which a first subscriber identity module (SIM) is designated as a default data subscription (DDS) and a second SIM is designated as a non-default data subscription (nDDS), including the first SIM being active and the second SIM being idle;
means for analyzing positions of uplink symbols and downlink symbols within a slot format of the first SIM;
means for causing the antenna switching module associated with radio frequency (RF) receive circuitry of the UE to couple the second SIM to antenna during a first symbol that is configured as uplink or flexible in accordance with analyzing the positions of the uplink symbols and the downlink symbols; and
means for performing a page decode operation by the second SIM while the second SIM is coupled to the antenna.

18. The UE of clause 17, further comprising:
means for causing the antenna switching module to uncouple the second SIM from the antenna during a second symbol that is configured as uplink or flexible.

19. The UE of clauses 17-18, further comprising:
means for causing the antenna switching module to uncouple the second SIM from the antenna after the page decode operation has occurred and during a second symbol that is configured as downlink and does not correspond to a synchronization signal block (SSB) or a tracking reference signal (TRS).

20. A user equipment (UE) comprising:
a first subscriber identity module (SIM) associated with a first service provider subscription and a second SIM associated with a second service provider subscription;
a processor configured to access the first SIM and the second SIM, wherein the processor is further configured to:
operate the first SIM in an active mode and the second SIM in an idle mode;
analyze a slot format from a network, the slot format defining at least some symbols for uplink and other symbols for downlink for the first SIM;
consistent with analyzing the slot format, set a timing for an antenna switching module of the UE to couple the second SIM to an antenna, wherein the timing is set to avoid interfering with at least one of the other symbols for downlink; and
perform a page decode operation by the second SIM while the second SIM is coupled to the antenna.

21. The UE of clause 20, wherein the processor is further configured to:
cause the antenna switching module to un-couple the second SIM from the antenna after the page decode operation has occurred and during a second symbol that is configured as uplink or flexible.

22. The UE of clauses 20-21, wherein the processor is further configured to:
analyze the slot format to identify signal configurations of a plurality of symbols defined by the slot format.

23. The UE of clauses 20-22, wherein the processor is further configured to:

determine that an uplink symbol does not occur within a guard timer period after the page decode operation; and cause the antenna switching module to un-couple the second SIM from the antenna after the page decode operation has occurred and during a first symbol that is configured as downlink and does not correspond to a synchronization signal block (SSB) or a tracking reference signal (TRS) in response to determining that the uplink symbol does not occur within the guard timer period.

24. The UE of clauses 20-22, wherein the processor is further configured to:

cause the antenna switching module to un-couple the second SIM from the antenna after the page decode operation has occurred and during a first symbol that is configured as downlink and does not correspond to a synchronization signal block (SSB) or a tracking reference signal (TRS).

25. The UE of clauses 20-24, wherein the processor is configured to operate the UE in a dual-SIM dual-standby (DSDS) mode.

26. The UE of clause 25, wherein the first SIM is designated as a default data subscription (DDS) and a second SIM is designated as a non-default data subscription (nDDS).

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular aspects illustrated and described herein, as they are merely by way of some examples thereof, but rather, should be fully commensurate with that of the claims appended hereafter and their functional equivalents.

What is claimed is:

1. A method of wireless communication performed by a user equipment (UE), the method comprising:

operating in a mode in which a first subscriber identity module (SIM) is designated as a default data subscription (DDS) and a second SIM is designated as a non-default data subscription (nDDS), including the first SIM being active and the second SIM being idle;

determining positions of uplink symbols and downlink symbols within a slot format of the first SIM;

causing a hardware switch of the UE coupling the first SIM to an antenna to couple the second SIM to the antenna of the UE during a first symbol that is configured as uplink or flexible while maintaining the coupling of the first SIM to the antenna; and performing a page decode operation by the second SIM while the second SIM is coupled to the antenna and the first SIM is coupled to the antenna.

2. The method of claim 1, further comprising:

causing the hardware switch to un-couple the second SIM from the antenna after the page decode operation has occurred and during a second symbol that is configured as uplink or flexible.

3. The method of claim 1, wherein determining the positions of the uplink symbols and the downlink symbols comprises:

analyzing the slot format of the first SIM to identify signal configurations of a plurality of symbols defined by the slot format.

4. The method of claim 3, further comprising:

determining that an uplink symbol does not occur within a guard timer period after the page decode operation; and causing the hardware switch to un-couple the second SIM from the antenna after the page decode operation has occurred and during a second symbol that is configured as downlink and does not correspond to a synchronization signal block (SSB) or a tracking reference signal (TRS) in response to determining that the uplink symbol does not occur within the guard timer period.

5. The method of claim 3, further comprising:

causing the hardware switch to un-couple the second SIM from the antenna after the page decode operation has occurred and during a second symbol that is configured as downlink and does not correspond to a synchronization signal block (SSB) or a tracking reference signal (TRS).

6. The method of claim 1, wherein causing the hardware switch to couple the second SIM to the antenna includes:

performing an impedance matching operation to match an impedance of the hardware switch to an impedance of a load within the UE.

7. The method of claim 1, wherein the positions of the uplink symbols and the downlink symbols conform to a time division duplexing (TDD) mode of operation by the UE.

8. The method of claim 1, wherein page decode is performed during a second symbol, and wherein the first symbol and the second symbol are adjacent.

9. The method of claim 1, wherein page decode is performed during a second symbol, and wherein the first symbol and the second symbol are separated in time by at least one additional symbol.

10. The method of claim 1, wherein determining the positions of the uplink symbols and the downlink symbols comprises:
analyzing the slot format of the first SIM to identify UL and DL configurations of a plurality of symbols defined by the slot format.

11. A non-transitory computer-readable medium having program code recorded thereon for wireless communication by a user equipment (UE), the program code comprising:
code for operating the UE so that a first subscriber identity module (SIM) is in an active mode and a second SIM is in an idle mode;
code for analyzing a slot format from a network, the slot format defining at least some symbols for uplink and other symbols for downlink for the first SIM;
code for, consistent with the analyzing, setting a timing for a radio frequency (RF) switch of the UE coupling the first SIM to an antenna to couple the second SIM to the antenna while maintaining the coupling of the first SIM to the antenna, wherein the timing is set to avoid interfering with at least one of the other symbols for downlink; and
code for performing a page decode operation by the second SIM while the second SIM is coupled to the antenna and the first SIM is coupled to the antenna.

12. The non-transitory computer-readable medium of claim 11, further comprising:
code for setting the timing for the RF switch to uncouple the second SIM from the antenna, wherein the timing is set to avoid interfering with at least one of the other symbols for downlink.

13. The non-transitory computer-readable medium of claim 11, wherein the code for operating the UE so that the first SIM is in the active mode comprises:
code for operating the UE so that the first SIM is designated as a default data subscription (DDS) and the second SIM is designated as a non-default data subscription (nDDS).

14. The non-transitory computer-readable medium of claim 11, wherein the code for operating the UE so that the first SIM is in the active mode comprises:
operating the UE in a dual-SIM dual-standby (DSDS) mode.

15. The non-transitory computer-readable medium of claim 11, further comprising:
code for determining that an uplink symbol does not occur within a guard timer period after the page decode operation; and
code for causing the RF switch to un-couple the second SIM from the antenna after the page decode operation has occurred and during a first symbol that is configured as downlink and does not correspond to a synchronization signal block (SSB) or a tracking reference signal (TRS) in response to determining that the uplink symbol does not occur within the guard timer period.

16. The non-transitory computer-readable medium of claim 11, further comprising:
causing the RF switch to un-couple the second SIM from the antenna after the page decode operation has occurred and during a first symbol that is configured as downlink and does not correspond to a synchronization signal block (SSB) or a tracking reference signal (TRS).

17. A user equipment (UE) comprising:
a first subscriber identity module (SIM) and a second SIM;
an antenna switching module disposed between the first SIM and an antenna and disposed between the second SIM and the antenna;
means for operating in a mode in which the first SIM is designated as a default data subscription (DDS) and the second SIM is designated as a non-default data subscription (nDDS), including the first SIM being active and the second SIM being idle;
means for analyzing positions of uplink symbols and downlink symbols within a slot format of the first SIM;
means for causing the antenna switching module associated with radio frequency (RF) receive circuitry of the UE to couple the second SIM to the antenna while maintaining a coupling of the first SIM to the antenna during a first symbol that is configured as uplink or flexible in accordance with analyzing the positions of the uplink symbols and the downlink symbols; and
means for performing a page decode operation by the second SIM while the second SIM is coupled to the antenna and the first SIM is coupled to the antenna.

18. The UE of claim 17, further comprising:
means for causing the antenna switching module to un-couple the second SIM from the antenna during a second symbol that is configured as uplink or flexible.

19. The UE of claim 17, further comprising:
means for causing the antenna switching module to un-couple the second SIM from the antenna after the page decode operation has occurred and during a second symbol that is configured as downlink and does not correspond to a synchronization signal block (SSB) or a tracking reference signal (TRS).

20. A user equipment (UE) comprising:
a first subscriber identity module (SIM) associated with a first service provider subscription and a second SIM associated with a second service provider subscription;
a processor configured to access the first SIM and the second SIM, wherein the processor is further configured to:
operate the first SIM in an active mode and the second SIM in an idle mode;
analyze a slot format from a network, the slot format defining at least some symbols for uplink and other symbols for downlink for the first SIM;
consistent with analyzing the slot format, set a timing for an antenna switching module of the UE to couple the second SIM to an antenna while maintaining a coupling of the first SIM to the antenna, wherein the timing is set to avoid interfering with at least one of the other symbols for downlink; and
perform a page decode operation by the second SIM while the second SIM is coupled to the antenna and the first SIM is coupled to the antenna.

21. The UE of claim 20, wherein the processor is further configured to:
cause the antenna switching module to un-couple the second SIM from the antenna after the page decode operation has occurred and during a second symbol that is configured as uplink or flexible.

22. The UE of claim 20, wherein the processor is further configured to:
analyze the slot format to identify signal configurations of a plurality of symbols defined by the slot format.

23. The UE of claim 20, wherein the processor is further configured to:
determine that an uplink symbol does not occur within a guard timer period after the page decode operation; and cause the antenna switching module to un-couple the second SIM from the antenna after the page decode operation has occurred and during a first symbol that is configured as downlink and does not correspond to a synchronization signal block (SSB) or a tracking reference signal (TRS) in response to determining that the uplink symbol does not occur within the guard timer period.

24. The UE of claim 20, wherein the processor is further configured to:
cause the antenna switching module to un-couple the second SIM from the antenna after the page decode operation has occurred and during a first symbol that is configured as downlink and does not correspond to a synchronization signal block (SSB) or a tracking reference signal (TRS).

25. The UE of claim 20, wherein the processor is configured to operate the UE in a dual-SIM dual-standby (DSDS) mode.

26. The UE of claim 25, wherein the first SIM is designated as a default data subscription (DDS) and the second SIM is designated as a non-default data subscription (nDDS).

* * * * *